(12) United States Patent
Buer et al.

(10) Patent No.: US 8,333,317 B2
(45) Date of Patent: Dec. 18, 2012

(54) SYSTEM AND METHOD FOR AUTHENTICATING THE PROXIMITY OF A WIRELESS TOKEN TO A COMPUTING DEVICE

(75) Inventors: Mark Buer, Gilbert, AZ (US); Ed Frank, Atherton, CA (US); Nambi Seshadri, Irvine, CA (US)

(73) Assignee: Broadcom Corporation, Irvine, CA (US)

(*) Notice: Subject to any disclaimer, the term of this patent is extended or adjusted under 35 U.S.C. 154(b) by 896 days.

(21) Appl. No.: 10/955,806

(22) Filed: Sep. 30, 2004

(65) Prior Publication Data

US 2005/0105734 A1    May 19, 2005

Related U.S. Application Data

(60) Provisional application No. 60/609,537, filed on Sep. 13, 2004, provisional application No. 60/507,586, filed on Sep. 30, 2003.

(51) Int. Cl.
*G06K 5/00* (2006.01)

(52) U.S. Cl. ........ 235/380; 235/381; 235/375; 235/382; 713/155; 713/161; 713/169; 713/170; 713/168; 713/172; 713/184; 713/201; 726/2; 726/3; 726/4; 726/5; 726/21; 726/27; 726/28; 726/29; 726/30; 726/9; 380/255; 380/270; 455/411

(58) Field of Classification Search ........ 726/9
See application file for complete search history.

(56) References Cited

U.S. PATENT DOCUMENTS

| | | | | |
|---|---|---|---|---|
| 3,324,647 A | * | 6/1967 | Jedynak | 368/6 |
| 5,237,616 A | * | 8/1993 | Abraham et al. | 713/193 |
| 5,668,876 A | * | 9/1997 | Falk et al. | 380/271 |
| 6,088,450 A | | 7/2000 | Davis et al. | |
| 7,069,444 B2 | * | 6/2006 | Lowensohn et al. | 713/185 |

(Continued)

OTHER PUBLICATIONS

Communication from the EPO dated Jan. 3, 2005 enclosing 1) European Search Report Application No. 04023384.3.-1245-, Search Completed Dec. 21, 2004, The Hague (3 pages).

*Primary Examiner* — Nathan Flynn
*Assistant Examiner* — Bryan Wright
(74) *Attorney, Agent, or Firm* — Sterne, Kessler, Goldstein & Fox P.L.L.C.

(57) ABSTRACT

Access to secured services may be controlled based on the proximity of a wireless token to a computing device through which access to the secured services is obtained. An authorized user may be provided access to a service only when a wireless token assigned to the user is in the proximity of the computing device. A user's credential may be stored on an RFID token and an RFID reader may be implemented within a security boundary on the computing device. Thus, the credential may be passed to the security boundary without passing through the computing device via software messages or applications. The security boundary may be provided, in part, by incorporating the RFID reader onto the same chip as a cryptographic processing component. Once the information is received by the RFID reader it may be encrypted within the chip. As a result, the information may never be presented in the clear outside of the chip. The cryptographic processing component may cryptographically encrypt/sign the credential received from the token so that assurance may be provided to a service provider that the credentials came from a token that was proximate to the computing device. An RFID reader, cryptographic processing components and a wireless network controller may be implemented on a single chip in a mobile device.

17 Claims, 11 Drawing Sheets

U.S. PATENT DOCUMENTS

| | | | |
|---|---|---|---|
| 7,188,360 B2* | 3/2007 | Gerdes et al. | 726/4 |
| 7,231,657 B2* | 6/2007 | Honarvar et al. | 726/2 |
| 7,239,865 B2* | 7/2007 | Dyck et al. | 455/411 |
| 7,357,312 B2* | 4/2008 | Gangi | 235/380 |
| 2001/0021950 A1 | 9/2001 | Hawley et al. | |
| 2002/0087867 A1 | 7/2002 | Oberle et al. | |
| 2003/0046541 A1* | 3/2003 | Gerdes et al. | 713/168 |
| 2003/0087629 A1 | 5/2003 | Juitt et al. | |
| 2004/0153649 A1* | 8/2004 | Rhoads et al. | 713/176 |
| 2004/0203638 A1* | 10/2004 | Chan et al. | 455/414.1 |
| 2005/0058292 A1* | 3/2005 | Diorio et al. | 380/270 |
| 2005/0165695 A1* | 7/2005 | Berardi et al. | 705/64 |

* cited by examiner

SYSTEM AND METHOD FOR AUTHENTICATING THE PROXIMITY OF A WIRELESS TOKEN TO A COMPUTING DEVICE

CROSS-REFERENCE TO RELATED APPLICATION(S)

This application claims the benefit of U.S. Provisional patent application Ser. No. 60/609,537, filed Sep. 13, 2004, and U.S. Provisional Patent Application Ser. No. 60/507,586, filed Sep. 30, 2003, the disclosures of which are hereby incorporated by reference herein.

TECHNICAL FIELD

This application relates to data communication systems and, more specifically, to techniques for authenticating proximity of a wireless token in a communication system.

BACKGROUND

A variety of security techniques are known for protecting information in and controlling the operation of a computing device such as a personal computer ("PC"), a server or a mobile device. For example, physical and/or cryptographic techniques may be employed to control access to the computing device and to data stored in the computing device.

Physical security techniques may include locating the computing device in a secure location, locking the computing device in an enclosure, protecting integrated circuits (i.e., chips) from invasive monitoring by encapsulating the chips in, for example, an epoxy.

Cryptographic techniques may include one or more of encryption, decryption, authentication, signing and verification. In some applications data encryption and decryption techniques may be used to prevent unauthorized applications or persons from accessing data stored in the computing device. For example, security passwords that are used to restrict access a PC may be stored on the PC in an encrypted form. The operating system may then decrypt password when it needs to compare it with a password typed in by a user.

In some applications authentication techniques may be used to verify that a given set of data is authentic. For example, when a server receives a message from a remote client, authentication information associated with the message may used to verify that the message is from a specific source. In this way, the server may ensure that only authorized clients access the applications and data provided by the server.

In practice, there may be circumstances under which the process of sending secret credentials such as a password or cryptographic key may be compromised. For example, when a user uses a computing device to access a secured service, the user may first need to enter the secret credentials into the computing device. The computing device may then forward these credentials to a service provider that then determines whether the user is authorized to use the requested service.

In the event the computing device has been comprised by a hacker or a computer virus, an unauthorized person may gain access to these credentials. As a result, an unauthorized person may be able to access the secured service. Serious consequences may result when the secured service includes sensitive information such as financial data or personal information. Accordingly, a need exists for improved techniques for providing access to secured services.

SUMMARY

The invention relates to a system and method for authenticating the proximity of a wireless token to a computing device. For convenience, an embodiment of a system constructed or a method practiced according to the invention will be referred to herein simply as an "embodiment."

In one aspect, the invention relates to a system and method for providing access to a secured service based on a user's proximity to a proximity reader. Once the proximity is authenticated the user may then be allowed to access the secured service.

In some embodiments an authorized user is provided access to a service only when a wireless token assigned to the user is in the proximity of a computing device through which access to the secured services is obtained. In this way, a reasonable assumption may be made that the authorized user is in fact using the computing device to request the service. In contrast, if the request was being made by a hacker or a computer virus, access may be denied since the token may not be in the proximity of the computing device.

In some embodiments a user's credential are stored on an RFID token and an RFID reader is implemented within a security boundary on the computing device. In this way, the credential may be passed to the security boundary without passing through the computing device via software messages or applications. As a result, the credentials may not be intercepted by a hacker or computer virus that may have compromised the software executing on the computing system.

In some embodiments the security boundary may be provided, in part, using tamper resistant and/or tamper evident hardware. Thus, in the event the computer was physically tampered with in an attempt to compromise the security of the security boundary, such tampering may be ineffective or it may be evident to the user. In the latter case, the user may then take appropriate steps to re-secure the system.

In some embodiments, the RFID reader is incorporated onto the same chip as a cryptographic processing component. In this way, once the information from the RFID token is received by the RFID reader it may be encrypted within the chip. As a result, the information may never be presented in the clear (e.g., unencrypted) outside of the chip. Accordingly, the information may only be compromised by a clandestine RFID reader or by inspecting the internal contents of the chip. In conventional commercial settings, these scenarios may be unlikely. Accordingly, a system constructed according to the invention may provide improved access control for secured services.

In some embodiments, a cryptographic processing component may cryptographically encrypt and/or sign credentials received from a token. Thus, when a service provider receives the credentials, a high level of assurance may be provided to the effect that the credentials came from a token that was proximate to the particular computing device.

In some embodiments an RFID reader, a cryptographic processing component and one or more wireless network controller(s) may be implemented on a single chip in a mobile device. This may provide a cost effective and secure mechanism to limit access to the wireless network(s). In this case, network access may only be provided to the mobile device when a token is proximate to the mobile device and when that token has been assigned to an authorized user of that mobile device and the network(s).

BRIEF DESCRIPTION OF THE DRAWINGS

These and other features, aspects and advantages of the present invention will be more fully understood when considered with respect to the following detailed description, appended claims and accompanying drawings, wherein:

Figure 1:
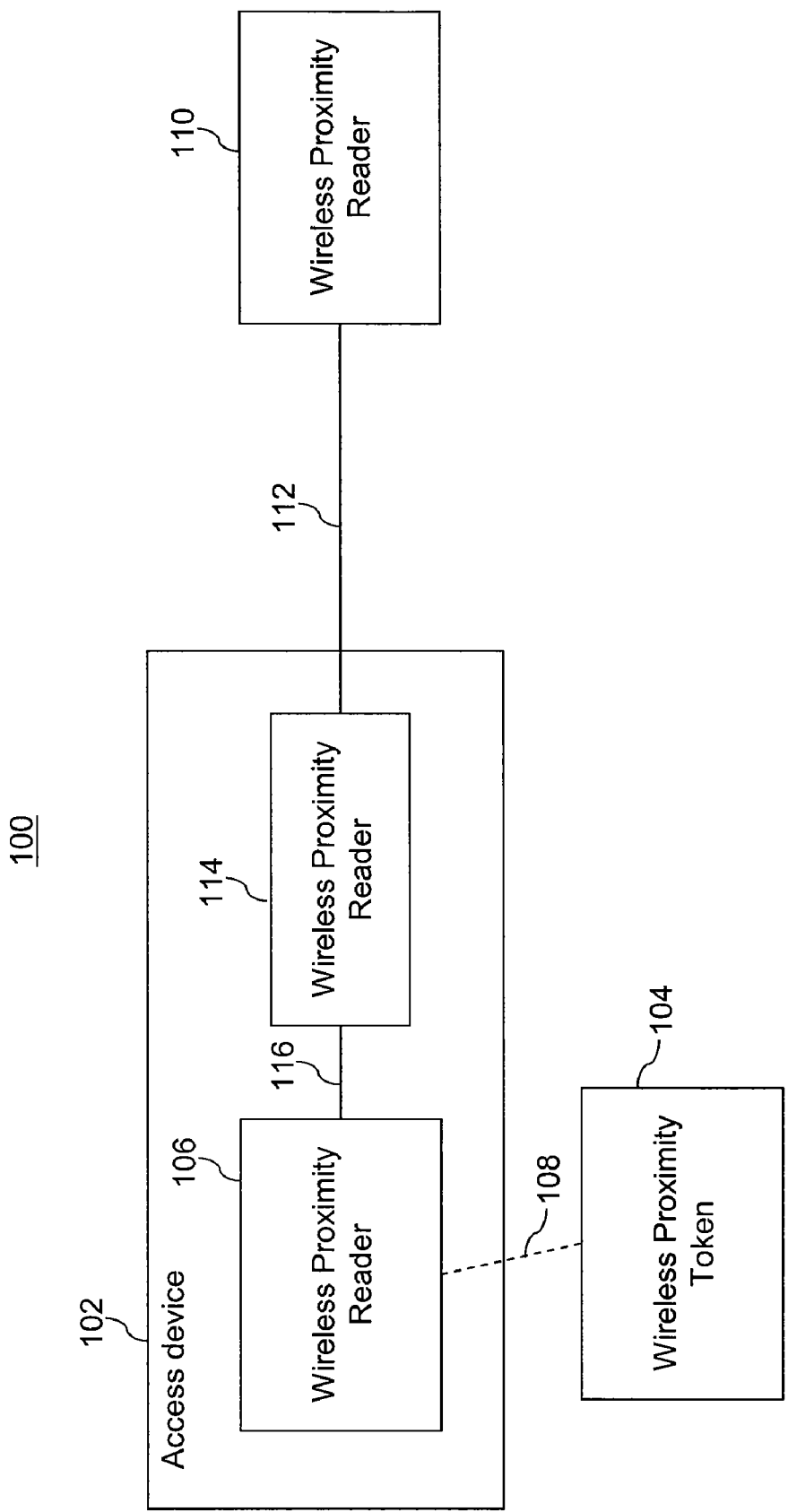
FIG. 1 is a simplified block diagram of one embodiment of a proximity-based authentication system constructed in accordance with the invention.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus or method. Finally, like reference numerals denote like features throughout the specification and figures.

DETAILED DESCRIPTION

The invention is described below, with reference to detailed illustrative embodiments. It will be apparent that the invention may be embodied in a wide variety of forms, some of which may be quite different from those of the disclosed embodiments. Consequently, the specific structural and functional details disclosed herein are merely representative and do not limit the scope of the invention.

FIG. 1 illustrates one embodiment of a system 100 where selected services may be provided to a user via a computing device only when a wireless token assigned to a user is proximate to the computing device. Operations of the system 100 will be explained in more detail in conjunction with the flowchart of FIG. 2.

Figure 2:
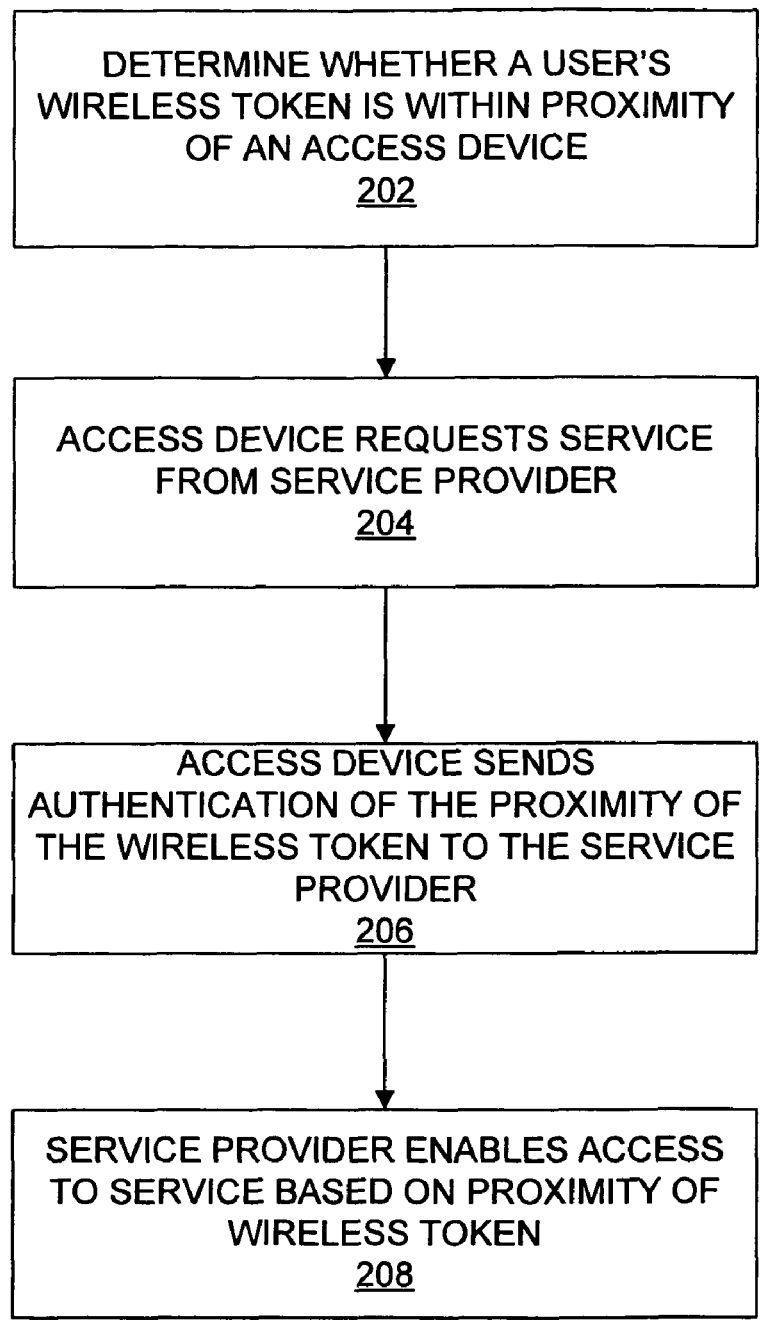
FIG. 2 is a flow chart of one embodiment of proximity-based authentication operations that may be performed in accordance with the invention.

As represented by block 202 in FIG. 2 an access device 102 (FIG. 1) such as a computer includes components that may be used to determine whether a wireless token 104 assigned to a user or users is proximate to the access device 102. For example, a wireless proximity reader 106 may be configured to receive signals 108 (e.g., RF signals) from the wireless proximity token 104. The signals 108 may include information that uniquely identifies the wireless proximity token 104. In addition, this information may include one or more credentials (e.g., a password) that may be used to access a secured service provided by a service provider 110.

The determination of proximity between the token 104 and the reader 106 may be established using a variety of mechanisms depending on the application. In some embodiments, the token will not generate signals until it is within a given distance of the reader. This may be accomplished, for example, by using a relatively passive token that intercepts signals transmitted by the reader and transmits signals in response to the received signals. Different distances between the token 104 and the reader 106 may be defined as indicative of proximity depending on the requirements of the application and, in some cases, characteristics of the operating environment.

As represented by block 204, the access device 102 may request access to a service from the service provider 110 by sending a signal over a communication media 112. Depending upon the particular application, the communication media 112 may comprise, for example, electric wires, optical cables or air.

Typically, access to the service will be initiated by the user's interaction with the access device 102. For example, the user may use a keyboard or pointing device (e.g., a computer mouse) to request the service. In conjunction with this the user may be asked to input a password and/or provide a biometric (e.g., a fingerprint) to a biometric reader to further verify the authenticity of the user. In this way, access to a service may be restricted until the user satisfies one or more verification queries including, for example, what the user knows (e.g., a password), what the user possesses (e.g., a token) and who the user is (e.g., a physical or biometric characteristic).

In some embodiments, the access device 102 may automatically request a predefined service once the user places the token 104 proximate the access device 102. For example, the access device 102 may include a database (not shown) that matches a given token (or information from the token) with one or more default services. Thus, when a token associated with default services approaches the access device 102, the access device 102 may automatically request the services from the service provider 110.

As represented by block 206, the access device 102 may send authentication-related information to the service provider 110 to indicate that the token 104 is proximate to the access device 102. For example, the access device 102 may include an authentication component 114 such that the determination of whether the token 104 is proximate the access device 102 is performed in a secure manner. In addition, the information provided by the token may be maintained within the access device 102 in a secure manner. For example, the information may only pass between the reader 106 and the authentication component 114 via a connection 116 within a common integrated circuit.

In addition, the authentication component 114 may be in secure communication with the service provider 110. This may be accomplished, for example, by placing the authentication component 114 and the service provider 110 on the same integrated circuit or within secured hardware. In addition, a cryptographically secured communication channel may be established between the authentication component 114 and the service provider 110.

In some embodiments, the authentication information may include information from the token. In the case where the communications over the media 112 may be cryptographically secured, the authentication component 114 may process (e.g., encrypt or sign) the information before sending it to the service provider 110. Since communications from the access device 102 may be trusted in this example, the authentication component 114 thereby provides a cryptographically reliable authentication that the information is from a specific token that is proximate that particular access device. In other words the encryption or cryptographic signing of the information may provide the necessary authentication.

After the service provider 110 has received an authenticated indication that the token is proximate the access device 102, the service provider 110 may then enable access to the requested service (block 208). This process may involve verifying that the information sent from the token 104 includes a credential associated with an authorized user and or access device.

As used herein the term service may include, for example, access to data and/or a data processing service. Thus, a service may enable an access device to, for example, read or write data in a data memory, access encrypted data, use cryptographic keys, gain access to cryptographic material such as security associations and keys, access a web page, access a data network or access a processing application.

As used herein the term data may include any information that may be accessed by a computing device including, for example, data files, passwords and cryptographic security associations including keys.

As used herein the term access may include, for example, acquiring, using, invoking, etc. Thus, data may be accessed by providing a copy of the data to the access device. Data also may be accessed by enabling the access device to manipulate or use the data. As an example of the latter, once a user has been authorized to access a service a trusted platform module may use keys to perform operations for the user. For a data network, access may include, for example, sending and/or receiving data over the network. For a processing application access may include, for example, invoking, interacting with or using the application or loading the application onto the access device.

A service provider may comprise hardware and/or software that facilitate providing a service. For example, a service provider may consist of a processing system that processes requests for service, verifies whether the requester is authorized to access the service and provides or facilitates the requested access.

In practice, a service provider (e.g., service provider 110) may be located local or remote with respect to the entity requesting service (e.g., access device 102). For example, a local trusted platform module may control access to passwords in a computing system and a remote wireless access point may control a computing system's access to a data network connected to the access point.

An access device may comprise hardware and/or software that facilitate access to a service. For example, a service provider may comprise a computing system such as, without limitation, a personal computer, a server, a cellular phone, a personal data assistant ("PDA"), etc.

For convenience, FIG. 1 only depicts one token, access device and service provider. It should be understood, however, that a system may include any number of these components. For example, a user may use a token to access one or more services via one or more access devices. Thus, an access device may access services from multiple service providers. Also, multiple access devices may access the services provided by a given service provider.

Authorization to access a service may depend on the specific token and access device being used. For example, a user may be assigned one token to access certain services through certain access devices. In addition, the user may be assigned another token to access other services through the same or other devices. Also, multiple sets of information (e.g., credentials) may be included on a single token to enable a user to access different services or to enable multiple users to share a token.

A wireless proximity reader and token may be implemented using one or more of a wide variety of wireless proximity techniques. For example, the proximity reader and the token may support, without limitation, one or more of RFID, ISO 14443 and ISO 15693.

Tokens may be implemented in various physical forms depending upon the needs of the respective applications. For example, a token may be in a form that is easy to carry, similar to a plastic credit card, a "smart card" or a building access card. Also, a token may take the form of a tag or a label that may be attached to another article.

Examples of tokens may include, without limitation, smart cards, credit cards, dongles, badges, biometric devices such as fingerprint readers, mobile devices such as cellular telephones, PDAs, etc. In some embodiments, the token includes circuitry used in a typical smart card. For example, the token may store an encrypted password that may be sent to an authentication system.

Figure 3:
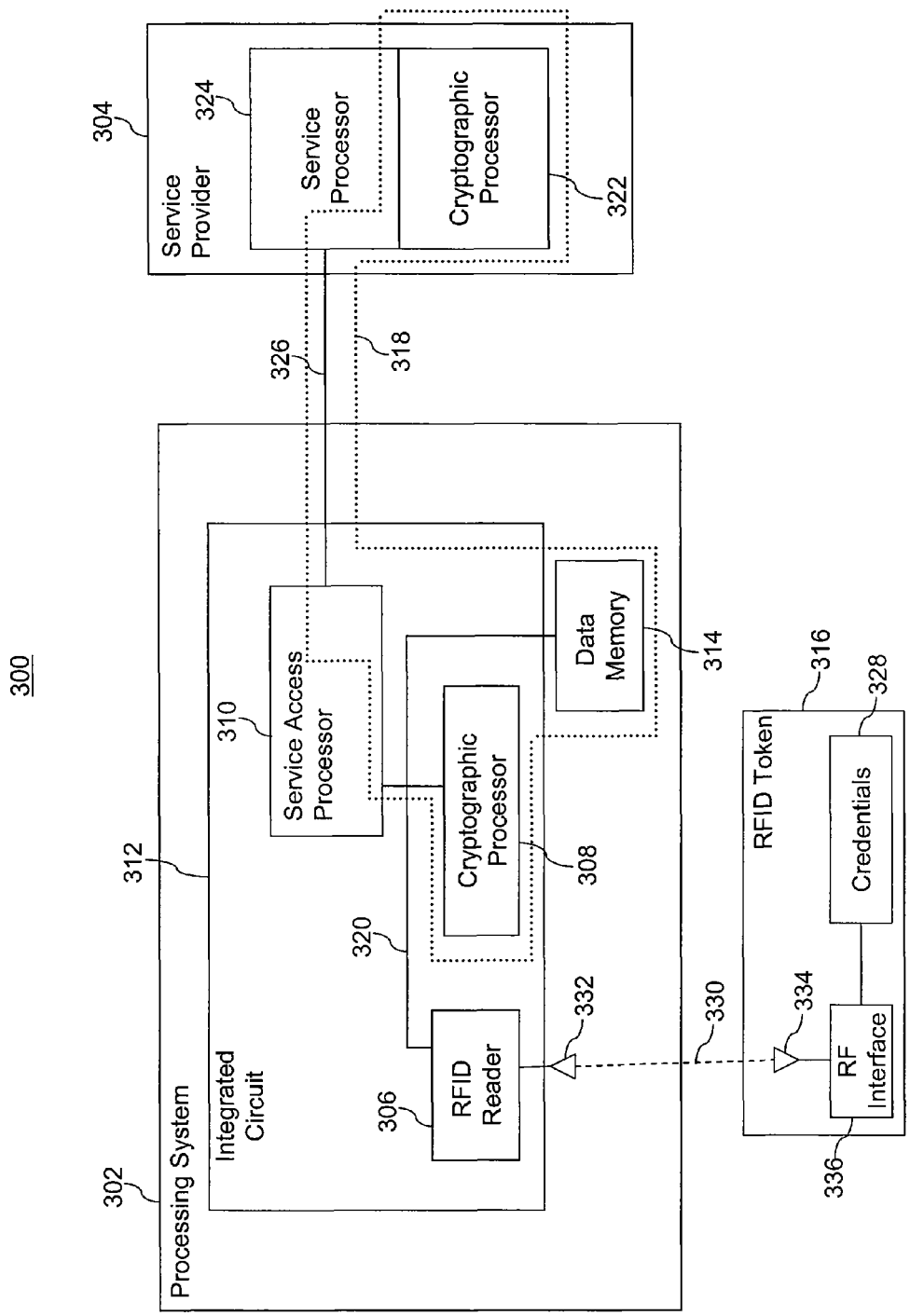
FIG. 3 is a simplified block diagram of one embodiment of a proximity-based authentication system constructed in accordance with the invention.
Figure 4:
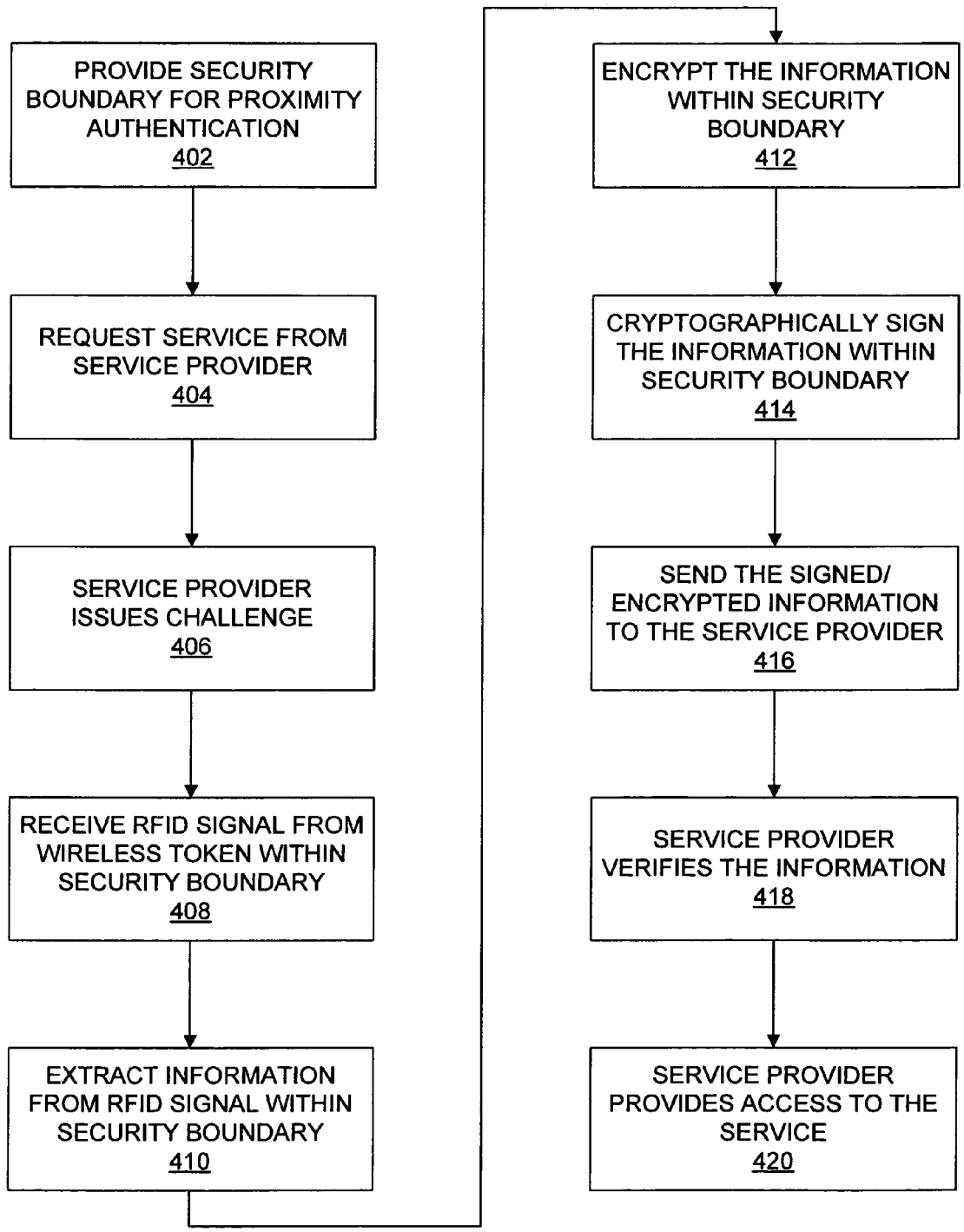
FIG. 4 is a flow chart of one embodiment of proximity-based authentication operations that may be performed in accordance with the invention.

Referring now to FIGS. 3 and 4 additional details of proximity-based authentication will be described. FIG. 3 depicts one embodiment of a proximity-based authentication system 300 where a processing system 302 is used to access services provided by a service provider 304. FIG. 4 describes several proximity-based authentication operations.

As represented by block 402 in FIG. 4 a security boundary is provided within the processing system 302 to, for example, secure the process of gaining access to a service, including securing the authentication process and information used during the authentication process. This security boundary may be established, for example, using hardware and/or cryptographic techniques.

Hardware techniques for providing a security boundary may include, for example, placing components within a single integrated circuit. For example, as shown in FIG. 3 an RFID reader 306, a cryptographic processor 308 and a service access processor 310 may be incorporated into a single integrated circuit 312. Thus, any processes performed or information used or stored within the integrated circuit 312 may not be compromised absent physical access to the integrated circuit 310 and the use of an invasive technique for analyzing the internal operations and data of the integrated circuit 312. For many applications, this form of hardware security boundary may provide an acceptably high level of security.

Other means may be provided to provide a security boundary. For example, one or more integrated circuits (e.g., integrated circuit 312) may be protected by a physical structure using known techniques (e.g., epoxy encapsulation). Also, the processing system 302 and/or its internal components may be tamper resistant and/or tamper evident.

Cryptographic techniques for providing a security boundary may include encrypting any important information that is sent to or from the integrated circuit via non-secure paths in the system. For example, security associations and keys may only appear in the clear within the integrated circuit 312. In the event keys need to be sent out of the integrated circuit 312 (e.g., to be stored in a data memory 314), the keys may first be encrypted.

Similarly, any important information that is sent between the integrated circuit 312 and the service provider 304 may be encrypted. For example, information (e.g., credentials 328) received from an RFID token 316 may be encrypted before being sent to the service provider 302.

In FIG. 3 a cryptographic security boundary is represented by the dashed line 318. The line 318 represents, in part, that encrypted information may be sent between the cryptographic processor 308, the service access processor 310 and the data memory 314. Thus, the information may be sent securely even though the mechanism through which this information is sent (e.g., a data bus 320) may not be secure.

Encrypted information also may be sent between the integrated circuit 312 and a cryptographic processor 322 and a service processor 324 in the service provider 304 via a communication link 326. In this case, the cryptographic processors 308 and 322 may perform key exchange and encryption, decryption and/or authentication operations necessary to send and receive the encrypted information and provide the information in the clear for internal processing.

In general, the form of protection provided within the system may depend on the requirements of a given application. For example, specifications such as FIPS-140-2 define various levels of security that may be implemented within a system The security boundary provided by the integrated circuit 312 and the cryptographic boundary 318 may be used to provide a secure mechanism for authenticating a user to access a service. For example, credentials 328 received from the RFID token 316 may be provided directly into the integrated circuit 312 via RF signals 330. Thus, the credentials 328 need not be entered into the processing system 302 via a software mechanism or hardware that is accessible by software. Consequently, such information may not be compromised by hacking or a software virus at this stage of the process.

Once the information is in the integrated circuit 312 it may be protected by the physical boundary of the integrated circuit 312 and by the cryptographic boundary 318. For example, provisions may be made to ensure that the information does not appear in the clear outside of the integrated circuit 312. Thus even if rogue software in the processing system 302 were to gain access to the information outside of the chip 312, the software would not be able to decrypt it without appropriate key information. However, the key information also may be protected within the integrated circuit 312 and the cryptographic boundary 318. That is, the key information may not appear in the clear outside of the security boundary. As a result, the credentials may be securely routed to the service provider 304.

Moreover, via this secured mechanism, the processing system 302 may reliably authenticate to the service provider 304 that a specific RFID token 316 is proximate the processing system 302. First, as discussed above, the credentials may be received in a secure manner. Second, the effective "decision" as to whether the token 316 is adjacent may be made within the security boundary. The cryptographic processor 308 may then cryptographically sign this information using a secure protocol set up between the cryptographic processors 308 and 322 of the processing system 302 and the service provider 304, respectively. Via this signature the service provider 304 may be assured that a given message came from a specific processing system (e.g., processing system 302) and that the message has not been compromised. Accordingly, proximity of the token 316 to the processing system 302 may be used as a reliable method of authorizing access to a secured service provided by the service provider 304.

Referring again to FIG. 4, an example of operations that may be used to access a service will be described. As represented by block 404 the processing system 302 may request access to a service provided by the service provider 304. As discussed above this access request may be initiated automatically or as a result of user input.

In some applications, the service provider 304 (via, for example, the service processor 324) may issue a challenge in response to the request (block 406). For example, the service processor 324 may request credentials such as a password. Inherent or explicit in this challenge may be a requirement that the user's token be proximate to the device that requested access (e.g., the processing system 302).

As represented by block 408 when the RFID token 316 is within an appropriate range of the processing system 302, the RFID reader 306 will receive an RFID signal 330 from the RFID token 316. As discussed above, the RFID signal 330 may be received by the processing system 302 within a security boundary.

An example of an RFID signaling sequence follows. The RFID reader 306 generates RF signals that are broadcast via an antenna 332. When a token 316 is relatively close to the RFID reader 306, an RF signal (e.g., as represented by line 330) may be received by an antenna 334 and processed by an RF interface 336 in the token 316. In some embodiments, the reader and the token may designed to communicate with one another when they are within a predefined distance of each other.

In some embodiments, the received RF signal may be used to power and activate the token 316. Thus, the token 316 may include circuitry that extracts energy from the received RF signal and converts this energy into power for the components on the token 316.

The token 316 may include circuitry that stores information such as the credentials 328 discussed herein. Thus, authentication information such as network authentication credentials, passwords and/or certificates may be stored in a data memory (e.g., a non-volatile memory) on the token 316.

As discussed in more detail below, when the token 316 is activated the RF interface 336 may generate an RFID signal that is broadcast by the antenna 334. Circuitry in the token 316 may be configured to modulate this RFID signal so that it includes some or all of the information stored on the token 316. The broadcast RFID signal (e.g., as represented by line 330) may then be received by the antenna 332 and sent to the RFID reader 306.

As represented by block 410, the system 300 may be configured so that any information contained within the broadcast RFID signal may be extracted only within a security boundary. For example, as shown in FIG. 3, the RDIF reader 306 that extracts the information from the RFID signal 330 may be located within an integrated circuit that includes other functionality to protect the information. For example, the integrated circuit 312 may include a cryptographic processor 308 that encrypts the information (block 412) to prevent the information from being sent out of the integrated circuit 312 in the clear.

As represented by block 414, this encryption process and/or another cryptographic process may be used to cryptographically sign the information. For example, the cryptographic processor 308 may use a private key to encrypt the information. A public key associated with this private key may be published with a certificate from a trusted entity. This certificate serves to verify that the public key is authentic. The cryptographic processor 322 may then use the public key to decrypt any encrypted information received from the cryptographic processor 308. A complementary process may be used to securely send information in the other direction across the link 326.

Accordingly, after the information is signed by the cryptographic processor 308, the service access processor 310 sends the signed information to the service processor 324 via the link 326 (block 416). In this way, the information is, in effect, sent over a secured channel (as represented by the corresponding portion of the line 318) even though the actual data path may not be secure.

The service processor 324 then sends the received information to the cryptographic processor 322 for decryption and/or authentication processing as necessary. The service processor 324 then verifies that the received information indicates that the user is authorized to access the requested service (block 418). In conjunction with this process, the service processor 324 has received an indication via the cryptographic signature associated with the information that the token 316 is proximate the processing system 302.

Accordingly, the service processor 324 may then provide access to the requested service. As discussed above, this may involve a variety of operations depending on the particular service requested. For example, if the service provider 304 is a key manager, the service may involve providing security associations or keys to the processing system. As discussed above, these keys may be sent to the processing system 302 via the secured channel (cryptographic boundary 318). In addition, the processing system 302 may be configured so that these keys, etc., are maintained within a security boundary.

Figure 5:
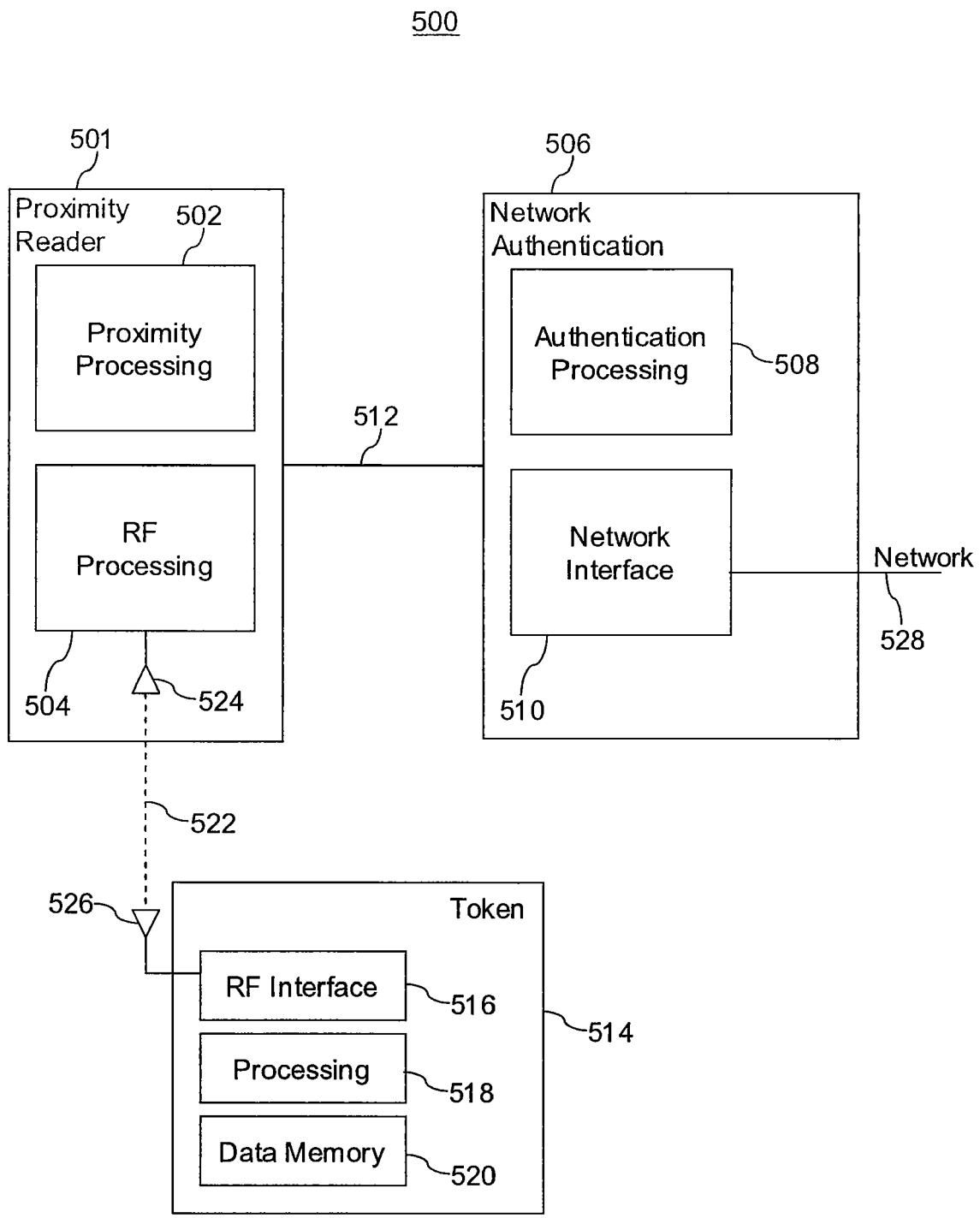
FIG. 5 is a simplified block diagram of one embodiment of a proximity-based network authentication system constructed in accordance with the invention.
Figure 6:
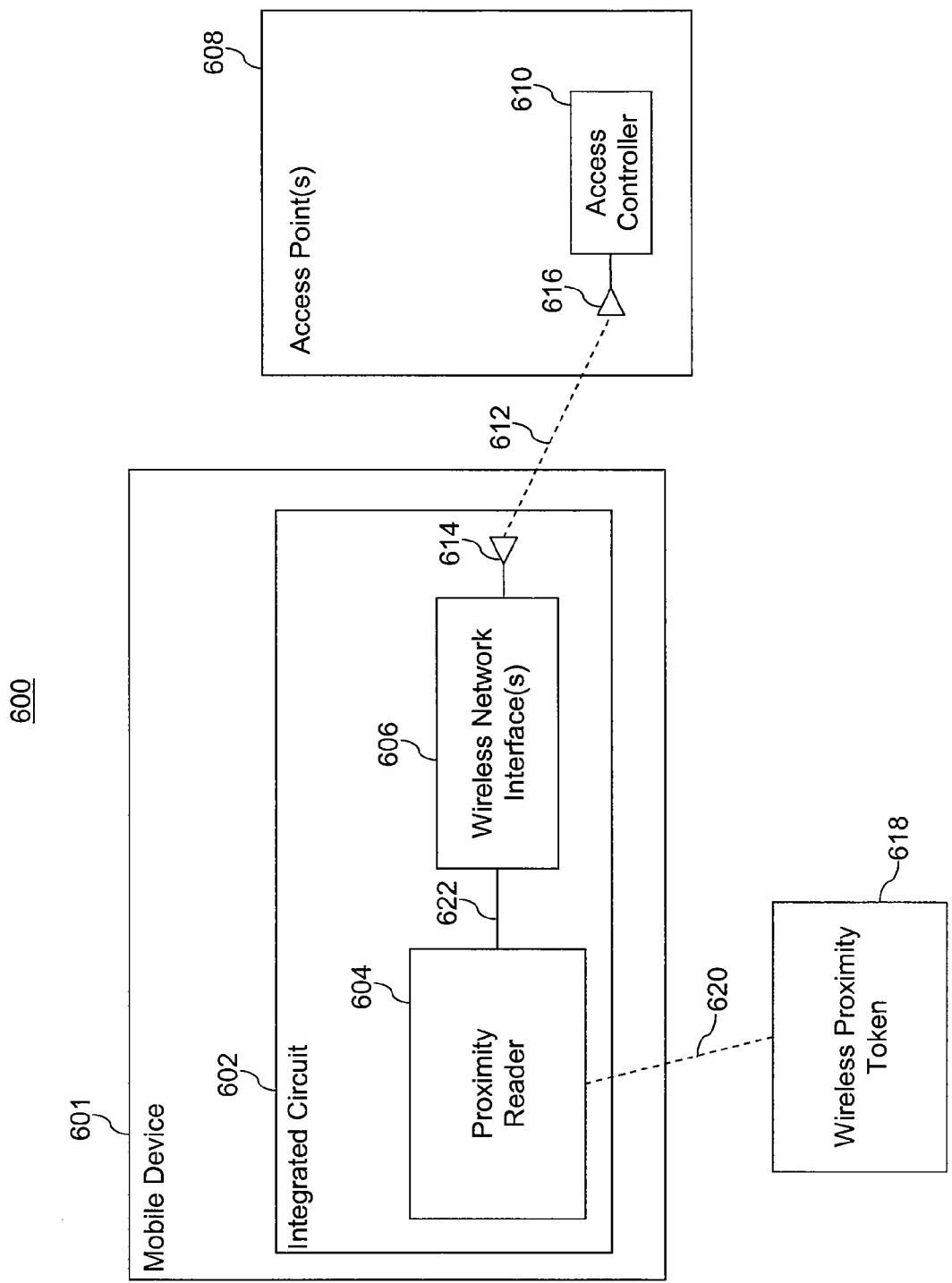
FIG. 6 is a simplified block diagram of one embodiment of a proximity-based wireless network authentication system constructed in accordance with the invention.
Figure 7:
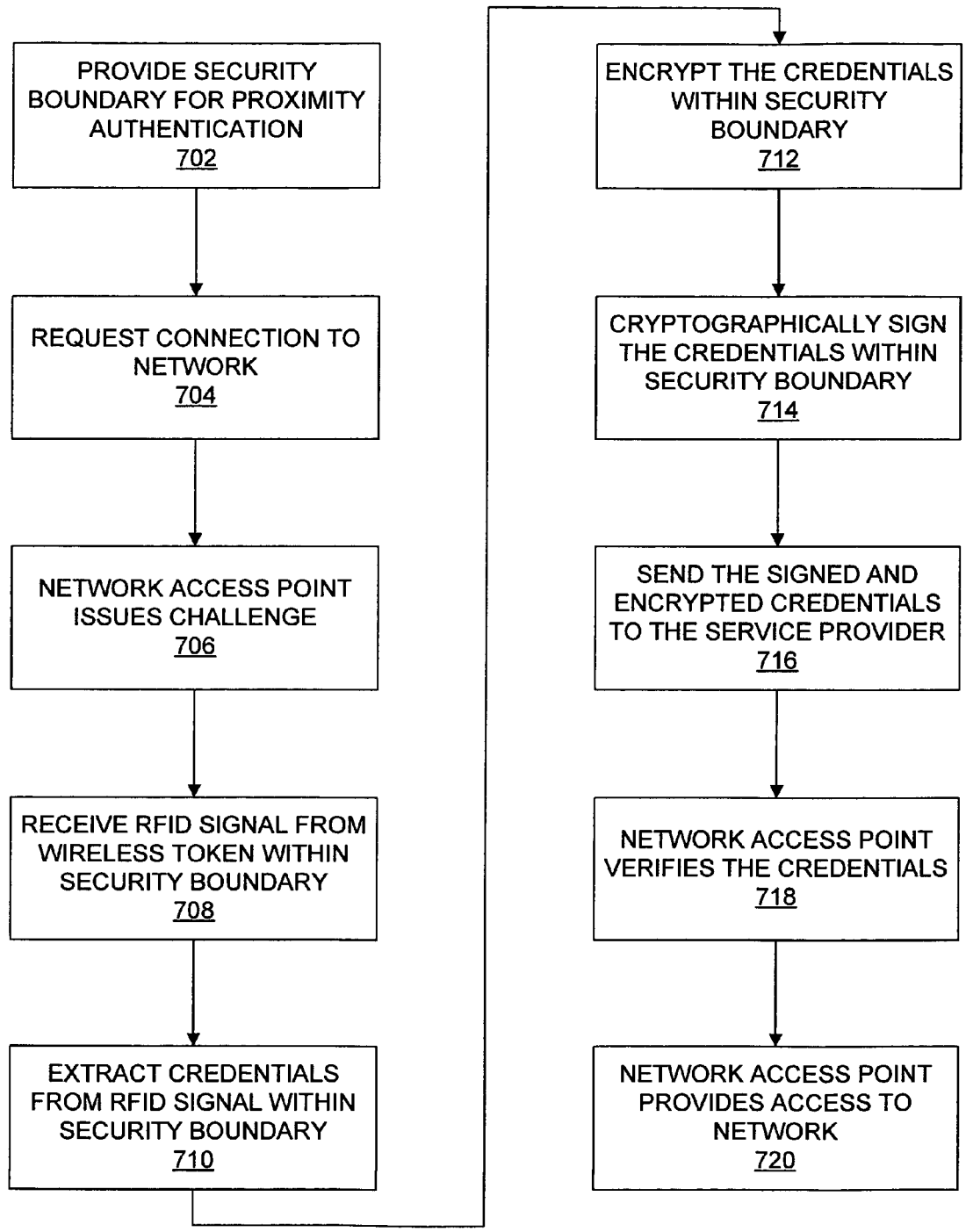
FIG. 7 is a flow chart of one embodiment of proximity-based network authentication operations that may be performed in accordance with the invention.

Referring now to FIGS. 5-7, embodiments of a wireless proximity and authentication system that controls access to one or more data networks will be discussed. These systems may enable a user to use a device to access, for example, one or more wired or wireless networks after the system verifies that the user (e.g., the user's token) is relatively close to the device. In this way, a reasonable inference may be made that an authorized user (as opposed to an unauthorized user or code) is attempting to access the network(s).

In FIG. 5 a communication system 500 includes a proximity reader 501, one or more network authentication components 506 and a wireless proximity token 514. To access a particular data network 528 a user (not shown) initiates a connection and/or authentication process via authentication processing 508 in a corresponding network authentication component 506. In response to the network's challenge to the request (e.g., the network's request for credentials) the user may bring the token 514 in relatively close physical proximity to the proximity reader 501. The proximity reader 501 may then receive appropriate authentication information from the token 514 and forward the authentication information to the network authentication component 506. The authentication processing 508 uses this authentication information to respond to the network's challenge. As a result, the user may be granted access to the data network 528. This process may then be repeated using different network authentication components to gain access to additional networks, if desired.

In some embodiments the proximity reader 501 and the token 514 communicate via RF signals as represented by dashed line 522. For example, a proximity processing component 502 controls RF processing 504 in the proximity reader 501 to generate RF signals that are broadcast via an antenna 524. When the token 514 is moved close enough to the proximity reader 501 so that these RF signals are sufficiently strong, the signals may be received by an antenna 526 and processed by an RF interface 516. In some embodiments, the received RF signals may be used to power and activate the token 514. As discussed below, when the token 514 is activated the RF interface 516 may generate RF signals that are sent back to the RF processing 504. The proximity processing component 502 may then process the received signals to verify that a particular token is within range. In addition, the proximity processing component 502 may process the information received from the token 514 before passing the information to the network authentication component 506.

The token 514 may include circuitry that provides the authentication information and proximity signaling. For example, authentication information such as network authentication credentials, passwords and/or certificates may be stored in a data memory 520 on the token. In some embodiments some or all of this authentication information may be encrypted.

The token 514 may include a processing component 518 that controls communication with the proximity reader 501. For example, the processing component 518 may enable the token 514 to be programmed with the authentication information. In addition, the processing component 518 may process RF signals received from the proximity reader 501 to power and activate the token 514. Also, the processing component 518 may control the generation of appropriate signals to send the authentication information to the proximity reader 501.

The network authentication component 506 may connect to one or more of a variety of networks. For example, the network 528 may comprise a wired or wireless network. The network interface 510 provides appropriate hardware and/or software to connect to such a network. In some embodiments the network interface comprises a media access controller ("MAC").

Thus, the system may be used to access one or more wired networks including, without limitation, personal area networks ("PANs"), local area networks ("LANs") and wide area networks ("WANs"). These networks may support a variety of protocols including, without limitation, Ethernet-based protocols.

The wireless network(s) may be implemented using one or more of a wide variety of wireless solutions. For example, a wireless network may comprise, without limitation, cellular telephone networks such as Global System for Mobile communications ("GSM") and General Packet Radio Service ("GPRS"), wireless local area networks such as 802.11a, 802.11b and/or 802.11g (referred to herein for convenience as simply 802.11) and personal area networks such as Bluetooth. Here, a wireless network interface may comprise a media access controller that supports one or more of these networks. In addition multiple wireless network interfaces may be used to provide connectivity to several wireless networks (e.g., 802.11 and Bluetooth).

FIG. 6 depicts an integrated wireless proximity apparatus and wireless communications system 600 that provides wireless communication access using proof of proximity for authentication purposes. In this embodiment, a user may use a mobile device 601 (e.g., a desktop personal computer, a laptop computer, a cellular phone, a PDA, etc.) to access one or more wireless networks (e.g., a cellular network, an 802.11 network, a Bluetooth network, etc.).

The user may use the token 618 in a similar manner as discussed above to quickly and securely access the wireless network. Thus, access to the wireless network may be provided when a user moves the token 618 within relatively close proximity (e.g., as may be defined in the proximity standards listed above) to the reader 604. The token then sends authentication information to the proximity reader 604 via RF signals 620.

The proximity reader 604 may, in turn, send authentication information to one or more wireless network interface(s) 606. Each network interface 606 may perform network authentication and connection processing to enable communication with a given wireless network. This may involve, for example, communicating with a respective access controller 610 in one or more access point(s) 608 via RF signals 612 transmitted and received via one or more antennas 614 and 616.

FIG. 6 also illustrates that a wireless proximity apparatus and a wireless communications system may be integrated into a single integrated circuit (e.g., "chip") 602. For example, in the embodiment of FIG. 6, the proximity reader 604 and one or more wireless network interface(s) 606 (e.g., an 802.11 MAC and a Bluetooth MAC) are implemented within the chip 602.

In this embodiment, sensitive information such as the authentication information from the token is not exposed in the mobile device outside the chip 602. Rather, these signals are sent between the proximity reader 604 and the network interface 606 via internal leads 622 in the chip 602. Accordingly, this information may be maintained within a security boundary as discussed herein.

In contrast, in embodiments where the proximity reader and the network interface are separate components in a computer (e.g., when line 612 in FIG. 6 represents a connection between separate integrated circuits), the authentication information may be passed between these components via conventional software message processing. If such a computer is compromised, the authentication information may be intercepted by unauthorized persons or code.

Referring to FIG. 7, an example of operations that may be used to access a data network will be described. For convenience, the network authentication component 506 and/or the mobile device 601 may be referred to as an access device in the discussion that follows.

As represented by block 702, the system may be configured to provide a security boundary as discussed herein. For example, as shown in FIG. 6 a proximity reader 604 and one or more wireless network interface(s) 606 may be incorporated into a single integrated circuit 602. Thus, information from the token 618 may be securely used within the mobile device 601 by, for example, not allowing the information to leave the integrated circuit 602 in the clear. Moreover, because a wireless connection is used to communicate with one or more access point(s) 608, the information may only appear within RF signals outside of the integrated circuit 602. In addition, cryptographic techniques as discussed herein may be used to provide a security boundary for the information. Similar techniques as described herein also may be used to provide a security boundary for the proximity reader 501 and the network authentication component(s) 506 of FIG. 5. To reduce the complexity of FIGS. 5 and 6, any cryptographic processing that may be provided in these systems is not shown.

As represented by block 704 the access system may request a connection to a network via a corresponding network access provider (e.g., access point 608). In a manner similar to the operations discussed above this request may be initiated automatically or as a result of user input.

In some applications, the network access provider may issue a challenge in response to the request (block 706). Thus, a network access point may request a credential such as a password. Inherent or explicit in this challenge may be a requirement that the user's token be proximate to the access device.

As represented by block 708 when the wireless token (e.g., token 514 or 618) is brought within an appropriate distance to the access device, the proximity reader (e.g., proximity reader 501 or 604) will receive an RF signal (e.g., an RFID signal) from the token. As discussed above, the RF signal may be received within the security boundary of the access device.

As represented by block 710, the system may be configured so that any information contained within the broadcast RF signal may be extracted only within a security boundary. This may be accomplished, for example, using some of the techniques discussed herein. As represented by blocks 712 and 714, a cryptographic process may be used to cryptographically encrypt/sign the information. After the information is signed by the cryptographic process, the access device sends the signed information to the network access provider (e.g., access point 608) as represented by block 716.

After verifying that the credentials are associated with an authorized user at block 718, the network access provider provides access to the requested network.

Referring now to FIGS. 8-11, embodiments of security processing systems (i.e., key management systems) that include wireless proximity and authentication will be discussed. These systems may enable a user to access, for example, services controlled by a security processing system on a computer. As discussed herein, service may be provided after the system verifies that the user (e.g., the user's token) is relatively close to the computer.

At a minimum, a security processing system provides key management functions such as generating keys, setting policy (e.g., capabilities and security limits) for keys and using keys in accordance with the corresponding policy (e.g., using the keys securely). In some embodiments a security processing system may implement key backup and recovery, prepare keys for storage, provide key revocation and destruction, provide multiple layers of security and provide other key management functions. Key management functions may involve authorized key usage such as smart card K of N access control or a key may be linked to a particular user, application, etc. Key management functions may involve secure audit logs such as tracking key usage to provide an audit trail.

Figure 8:
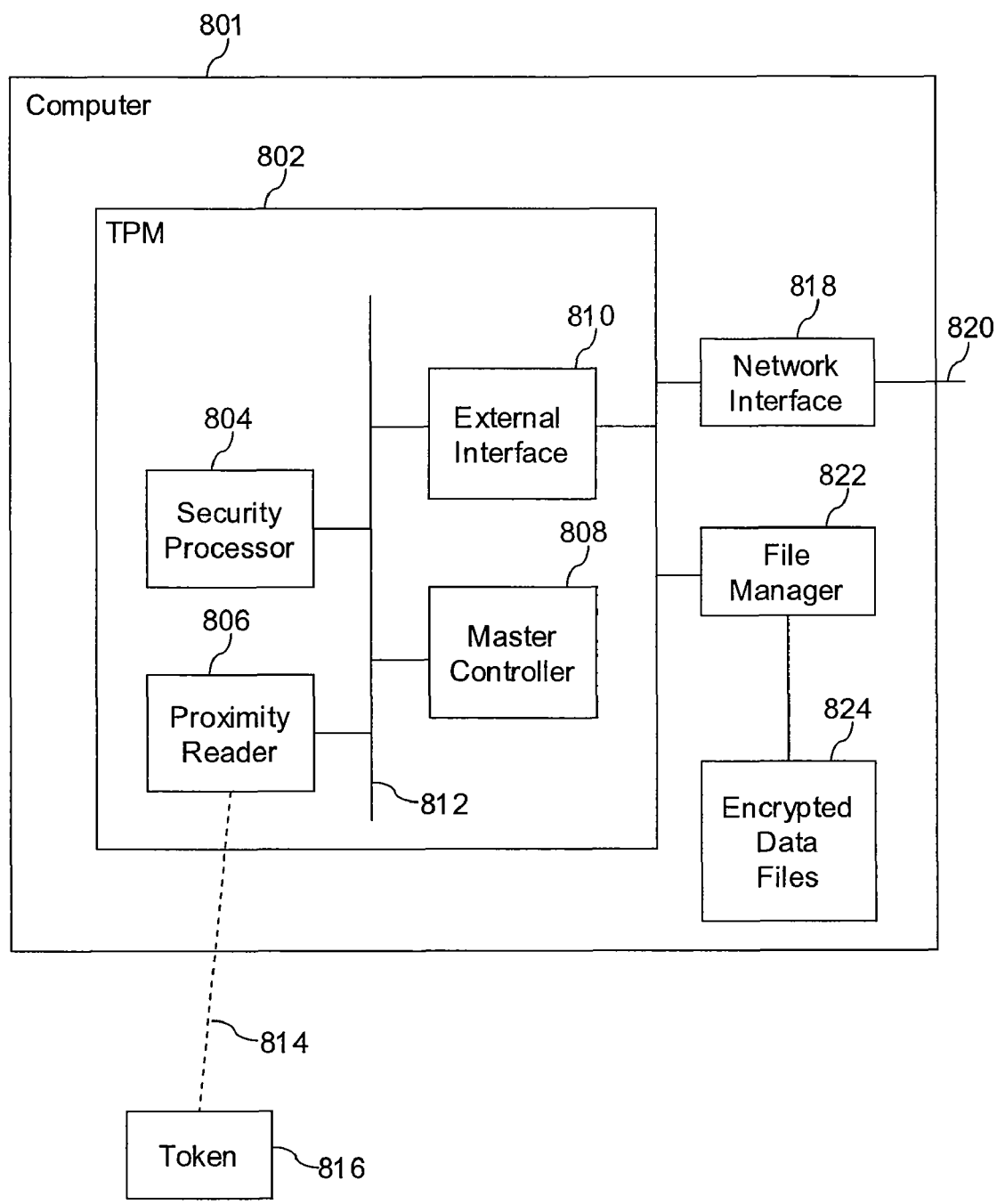
FIG. 8 is a simplified block diagram of one embodiment of proximity-based authentication for a trusted platform module constructed in accordance with the invention.

FIG. 8 depicts one embodiment of computing system 800 that incorporates a proximity reader 806 and a security processing system implemented as a trusted platform module ("TPM") 802. This embodiment may be used to authenticate access to data networks or other data services in a similar manner as discussed above. For example, a user may access a wired data network 820 or the user may access encrypted data stored in data files 824 (e.g., data memory).

A TPM may provide a set of cryptographic capabilities that enable certain computer functions to be securely executed within the TPM environment (e.g., hardware). Specifications for a TPM are defined by the Trusted Computing Group organization. As shown in FIG. 8, a TPM 802 (e.g., a TPM integrated circuit) may be incorporated into a computer.

In the embodiment of FIG. 8 the TPM 802 includes a master controller 808 for controlling the overall operation of the TPM, an external interface 810 for interfacing with other components in the computer and a security processor 804. The security processor 804 may perform cryptographic operations including, for example, encryption, decryption, authentication and key management. In the embodiment of FIG. 8, these components communicate via a bus 812.

In one aspect of the embodiment of FIG. 8, authorization information is stored on the token 816. For example, the token may store authorization data such a 100 bit encrypted password. The user may use the token 816 (and in some applications, other information or biometrics as discussed above) to authenticate himself or herself to the TPM 802.

In addition, network authentication credentials may be stored in a data memory (not shown) in the TPM 802. The TPM 802 may use these credentials to authenticate itself to an associated network and/or service provider.

Figure 9:
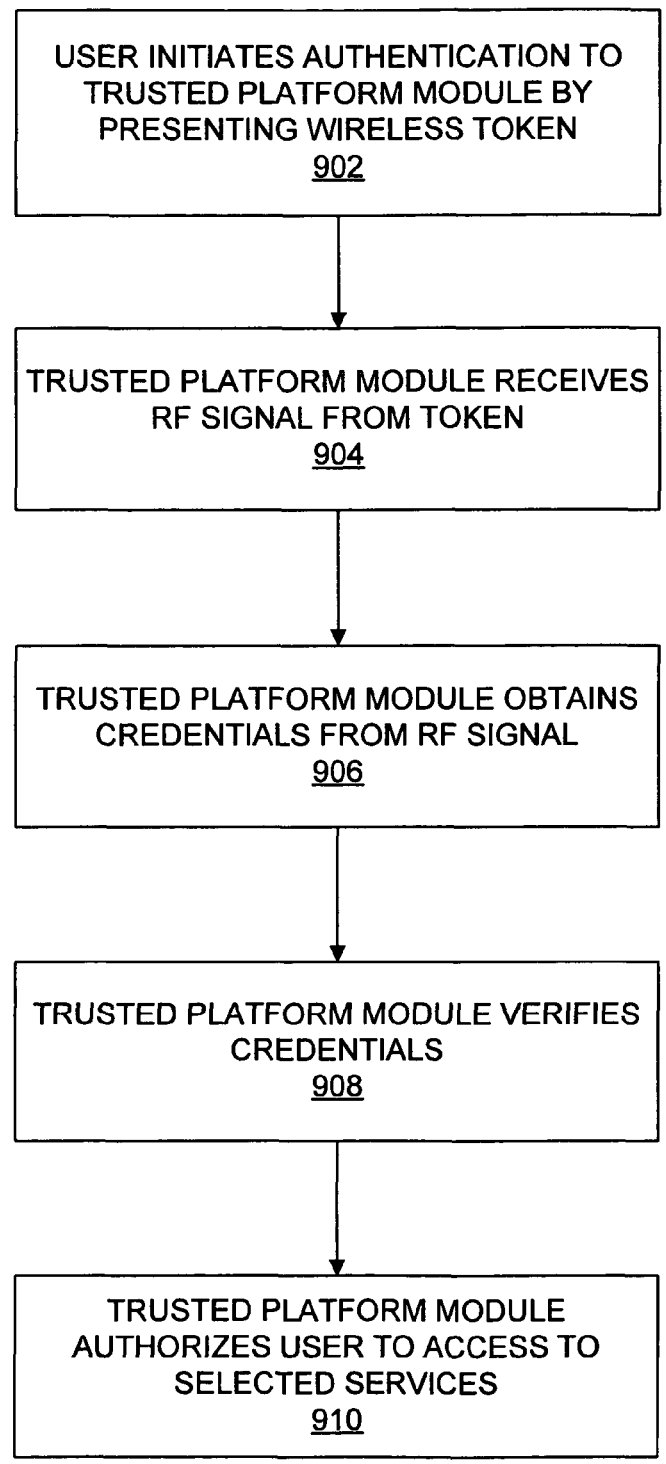
FIG. 9 is a flow chart of one embodiment of proximity-based authentication operations for a trusted platform module that may be performed in accordance with the invention.

Referring to FIG. 9, when a user wishes to access a service provided by the TPM 804, the user brings the token 816 in relatively close proximity with the computer 801 (block 902). In this way the user may authenticate himself or herself to the TPM 802.

As represented by block 904, the proximity reader 806 in the TPM 802 receives the RF signals 814 from the token 816 and extracts any embedded information such as the user's credentials (block 906). After verifying the information (block 908), the TPM 802 may provide the requested access or may facilitate acquiring access to a service from another processing entity (block 910).

For example, the system of FIG. 8 may be used to access encrypted data (e.g., an encrypted password) stored in a local data memory 824. In this case, the TPM 802 may store cryptographic information (e.g., keys, security associations, etc.) that enables the TPM to decrypt encrypted data. In some embodiments, encrypted data files 824 may be accessed via other components (e.g., a file manager 822) in the computer 801. The security of the encrypted data may be maintained in such components outside the TPM since decryption may be restricted to occur only within the TPM. In other words, sensitive information that is in the clear is not allowed to leave the secure boundary provided by the TPM 802.

Alternatively, the TPM 802 may provide the information to a service provider connected to a network 820. For example, the TPM 802 may send information such as network authentication credentials to one or more network access devices (not shown) via one or more network interfaces 818 to enable the user to gain access to one or more networks 820.

In the embodiment of FIG. 8, sensitive information such as the authentication information from the token is securely maintained in the computer inside the TPM. In a manner similar to that discussed above, this information may be provided directly to the TPM via the RF signal 814.

In contrast, in embodiments where the proximity reader and the TPM are separate components in the computer, the authentication information may be passed between these components via the software stack. In this case, if the stack is compromised, the authentication information may be compromised as well.

The network interface(s) 818 may be used to connect to wired and/or wireless network(s) 820. As discussed herein, cryptographic techniques may be used to ensure the security of data transferred between the TPM 802 and other devices connected to a network 820. Accordingly, a network connection may be used, for example, to communicate with a key manager to obtain key information (e.g., security associations) and authorization for key usage.

Figure 10:
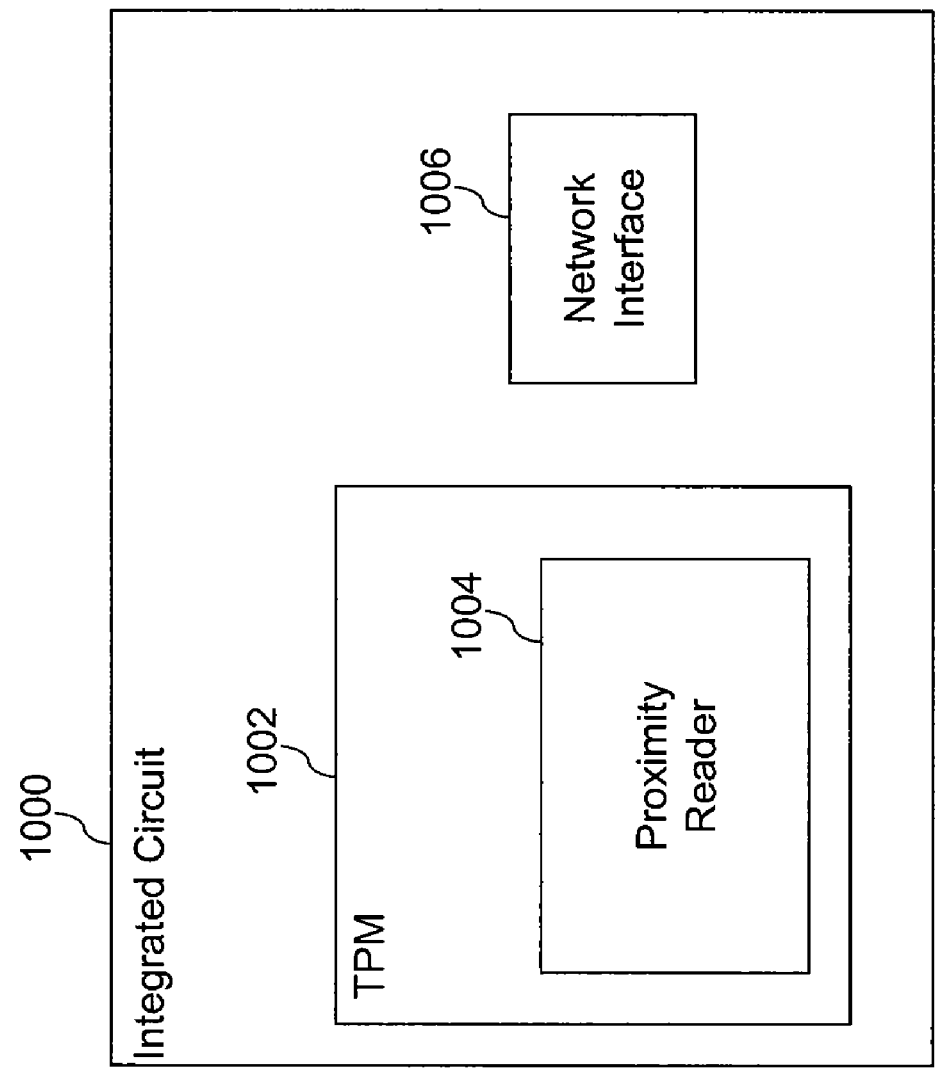
FIG. 10 is a simplified block diagram of one embodiment of an integrated circuit including a trusted platform module constructed in accordance with the invention.

As shown in FIG. 10, in some embodiments a TPM 1002, a proximity reader 1004 and one or more network interfaces (e.g., interface(s) 606 in FIG. 6) 1006 may be combined on a single integrated circuit 1000. In this way, sensitive information may be maintained within a security boundary defined by the chip 1000.

In addition, the combination of these components within a single chip may reduce the cost of the system. For example, by providing all of these components within a single CMOS integrated circuit the per chip cost of these components may be relatively small. As a result, it may be cost effective to provide the features discussed herein into a mobile device.

The embodiment of FIG. 10 may be advantageous when the network interface(s) provides connectivity to wireless network(s). As discussed above, by providing the network interface(s) 1006 on the same chip 1000 as the other access device components, sensitive information (e.g., credentials, passwords, keys, etc.) may only leave the secure boundary of the chip 1000 via RF signals. Thus, this may provide a relatively inexpensive and secure path directly to the TPM 1002 for authorization of key usage.

In some embodiments, the computer may comprise a point-of-sale device. That is, the token 816 (e.g., a token with smart card functionality) may provide the user's credit card information to the computer 801 and the computer 801 could securely receive and verify this information to perform a sales transaction.

Figure 11:
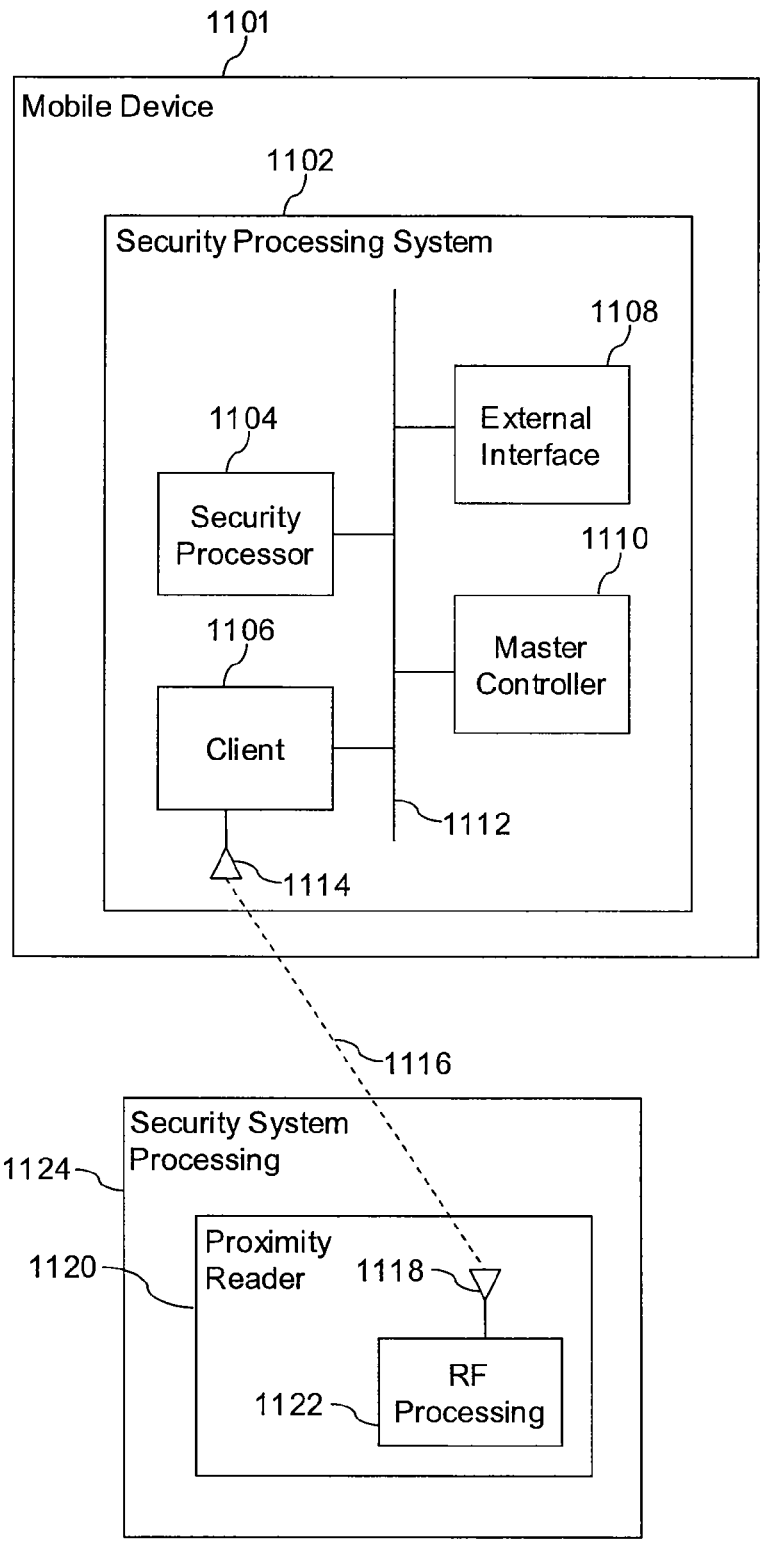
FIG. 11 is a simplified block diagram of one embodiment of proximity-based authentication for a trusted platform module constructed in accordance with the invention.

FIG. 11 depicts one embodiment of a system 1100 where a mobile device 1101 may be used to authenticate a user to another processing system (e.g., one that includes a security processing system 1124 such as a TPM). In this embodiment, the mobile device 1101 includes a security processing system 1102 (e.g., a TPM) that in turn includes an RFID client 1106. As discussed above, the security processing system (e.g., TPM) may include, for example, a security processor 1104, a master controller 1110 and an external interface 1108 that communicate via an internal bus 1112.

An RF signal 1116 transmitted by an antenna 1114 may then be received by a nearby proximity reader 1120 via an antenna 1118. In this way, for example, the mobile device 1101 (e.g., a laptop computer, a PDA, a cellular phone, etc.) may be used in a manner similar to a smart card. For example, the security processing system 1102 may store credit card information that may be sent to an RF processing component 1122 in a proximity reader 1120 in the security processing system 1124. Once this information is within the security boundary provided by the security processing system 1124, the information may be used, for example, by point-of-sale components (not shown) associated with the security processing system 1124 to access data services (e.g., perform a sales transaction).

From the above it should be appreciated that a wireless proximity and authentication system may be used to securely and efficiently access one or more data service(s) that may be associated with a variety of applications. These applications may include, without limitation, authentication applications relating to network access (RSA token), processing of biometrics, credit card transactions, and voice over Internet Protocol ("VoIP").

Different embodiments of the invention may include a variety of hardware and software processing components. In some embodiments of the invention, hardware components such as controllers, state machines and/or logic are used in a system constructed in accordance with the invention. In some embodiment of the invention, code such as software or firmware executing on one or more processing devices may be used to implement one or more of the described operations.

Such components may be implemented on one or more integrated circuits. For example, in some embodiments several of these components may be combined within a single integrated circuit. In some embodiments some of the components may be implemented as a single integrated circuit. In some embodiments some components may be implemented as several integrated circuits.

The components and functions described herein may be connected/coupled in many different ways. The manner in which this is done may depend, in part, on whether the components are separated from the other components. In some embodiments some of the connections represented by the lead lines in the drawings may be in an integrated circuit, on a circuit board and/or over a backplane to other circuit boards. In some embodiments some of the connections represented by the lead lines in the drawings may comprise a data network, for example, a local network and/or a wide area network (e.g., the Internet).

The signals discussed herein may take several forms. For example, in some embodiments a signal may be an electrical signal transmitted over a wire, light pulses transmitted over an optical fiber or electromagnetic (e.g., RF or infrared) radiation transmitter through the air.

A signal may comprise more than one signal. For example, a signal may consist of a series of signals. Also, a differential signal comprises two complementary signals or some other combination of signals. In addition, a group of signals may be collectively referred to herein as a signal.

Signals as discussed herein also may take the form of data. For example, in some embodiments an application program may send a signal to another application program. Such a signal may be stored in a data memory.

A wide variety of devices may be used to implement the data memories discussed herein. For example, a data memory may comprise Flash memory, one-time-programmable (OTP) memory or other types of data storage devices.

The components and functions described herein may be connected/coupled directly or indirectly. Thus, in some embodiments there may or may not be intervening devices (e.g., buffers) between connected/coupled components.

In summary, the invention described herein generally relates to an improved authentication system. While certain exemplary embodiments have been described above in detail and shown in the accompanying drawings, it is to be understood that such embodiments are merely illustrative of and not restrictive of the broad invention. In particular, it should be recognized that the teachings of the invention apply to a wide variety of systems and processes. It will thus be recognized that various modifications may be made to the illustrated and other embodiments of the invention described above, without departing from the broad inventive scope thereof. In view of the above it will be understood that the invention is not limited to the particular embodiments or arrangements disclosed, but is rather intended to cover any changes, adaptations or modifications which are within the scope and spirit of the invention as defined by the appended claims.

What is claimed is:

1. A communication system, comprising:
   a proximity reader within a security boundary, configured to receive a radio frequency (RF) signal from a wireless token located within a proximity to the proximity reader and extract a credential from the received RF signal, wherein the wireless token is configured to include a plurality of credentials for accessing different services from one or more service providers;
   a secure processor within the security boundary, configured to receive the credential from the proximity reader, to store the credential within the security boundary, and to cryptographically sign or encrypt the credential to allow a service provider system external to the security boundary to authenticate that the credential is from the wireless token; and
   an external interface within the security boundary configured to interface with components outside of the security boundary to send the cryptographically signed or encrypted credential to the service provider system in response to a challenge from the service provider system,
   wherein the security boundary is configured to prevent software that is executing external to the security boundary from accessing the credential extracted from the received RF signal by the proximity reader and stored by the secure processor.

2. The system of claim 1, wherein the proximity reader is an RFID reader.

3. The system of claim 1, wherein the secure processor is an authentication processor.

4. The system of claim 1, wherein the secure processor is a cryptographic processor.

5. The system of claim 1, further comprising:
   a network interface coupled to the external interface and configured to interface to a network.

6. The system of claim 1, wherein the credential comprises a key.

7. The system of claim 1, wherein the wireless token comprises an RFID device, the RFID device comprising:
   a data memory for storing the credential;
   an RF circuit coupled to the data memory for generating a signal according to the credential; and
   an antenna coupled to the RF circuit for transmitting the signal to the proximity reader.

8. The communication system of claim 1, wherein the credential is encrypted and the secure processor is further configured to decrypt the credential.

9. A method, comprising:
   receiving, within a security boundary of an access device a radio frequency (RF) signal including a credential from a wireless token within a proximity to the access device, wherein the wireless token includes a plurality of credentials for accessing different services from one or more service providers;
   extracting the credential from the RF signal within the security boundary;
   cryptographically signing the extracted credential within the security boundary to generate a cryptographic signature to allow a service provider system external to the security boundary to authenticate that the extracted credential is from the wireless token; and
   communicating the cryptographic signature outside the security boundary to the service provider system in response to a challenge from the service provider system,
   wherein the security boundary is configured to prevent software that is executing external to the security boundary from accessing the credential extracted from the RF signal and cryptographically signed.

10. The method of claim 9, further comprising:
    authenticating the credential.

11. The method of claim 9, further comprising:
    verifying the identity of the wireless token based on the credential.

12. The method of claim 9, further comprising:
    receiving access to a service provided by the service provider system after the the service provider system has authenticated the cryptographic signature.

13. A method, comprising:
    receiving within a security boundary of an access device a radio frequency (RF) signal including a credential from a wireless token within a proximity to the access device, wherein the wireless token includes a plurality of credentials for accessing different services from one or more service providers;
    extracting the credential from the RF signal within the security boundary;
    cryptographically signing or encrypting the credential to allow a service provider system external to the security boundary to authenticate that the credential is from the wireless token;
    authenticating the credential within the security boundary; and
    communicating the signed or encrypted credential to the service provider system in response to a challenge from the service provider system,
    wherein the security boundary is configured to prevent software that is executing external to the security boundary from accessing the credential extracted from the RF signal and cryptographically signed.

14. The method of claim 13, wherein the cryptographically signing or encrypting the credential further comprises:
encrypting the credential within the security boundary and communicating the encrypted credential to the service provider.

15. The method of claim 13, further comprising:
providing access to a service provided by the service provider after the signed or encrypted credential has been authenticated by the service provider system.

16. The method of claim 13, further comprising:
verifying the identity of the wireless token based on the credential.

17. The system of claim 5, wherein the service provider system is coupled to the network and configured to provide access to at least one of data and a data processing service after the credential has been authenticated.

* * * * *